US012087125B2

(12) United States Patent
Phillips, Jr.

(10) Patent No.: US 12,087,125 B2
(45) Date of Patent: Sep. 10, 2024

(54) GAMING MACHINE CABINET COMPARTMENT WITH FRONT ACCESS STRUCTURE

(71) Applicant: Everi Games Inc., Austin, TX (US)

(72) Inventor: Peter A. Phillips, Jr., Austin, TX (US)

(73) Assignee: Everi Games Inc., Austin, TX (US)

( * ) Notice: Subject to any disclaimer, the term of this patent is extended or adjusted under 35 U.S.C. 154(b) by 162 days.

(21) Appl. No.: 17/853,912

(22) Filed: Jun. 29, 2022

(65) Prior Publication Data

US 2024/0005725 A1 Jan. 4, 2024

(51) Int. Cl.
*G07F 17/32* (2006.01)

(52) U.S. Cl.
CPC ...... *G07F 17/3216* (2013.01); *G07F 17/3213* (2013.01)

(58) Field of Classification Search
None
See application file for complete search history.

(56) References Cited

U.S. PATENT DOCUMENTS 6,962,528 B2 11/2005 Yokota
7,985,139 B2 7/2011 Lind
9,697,679 B2 7/2017 Ho
10,755,519 B2 * 8/2020 Phillips, Jr. ......... G07F 17/3211
10,810,832 B2 10/2020 Gallagher
10,825,286 B2 * 11/2020 Gallagher ........... G07F 17/3202
2006/0073900 A1 4/2006 Cole
2008/0055491 A1 * 3/2008 Gordon ............... G07F 17/3216 463/20
2010/0120530 A1 5/2010 Lesley
2016/0184716 A1 * 6/2016 Sprenger ................. A63F 13/90 463/46
2018/0053373 A1 * 2/2018 Goldstein ........... G07F 17/3213
2019/0102983 A1 * 4/2019 Gallagher ........... G07F 17/3211
2020/0111285 A1 * 4/2020 Phillips, Jr. ......... G07F 17/3216

FOREIGN PATENT DOCUMENTS

GB 2388696 A 11/2003

* cited by examiner

*Primary Examiner* — Sunit Pandya
(74) *Attorney, Agent, or Firm* — The Culbertson Group, P.C.; Russell D. Culbertson

(57) ABSTRACT

A lift frame is mounted on a gaming machine compartment so as to be moveable between a lift frame latched position and a lift frame raised position along a lift axis defined within the compartment. A lift frame latch is operable to selectively retain the lift frame in the lift frame latched position. A pivot frame is pivotally mounted on the lift frame so as to be pivotable between a pivot frame latched position and a pivot frame raised position about a pivot axis defined at an upper end of the lift frame. A pivot frame latch operates between the pivot frame and lift frame to selectively retain the pivot frame in the pivot frame latched position but allow the pivot frame and a gaming machine panel mounted thereon to be pivoted so as to expose a compartment front opening and provide access to the compartment interior.

18 Claims, 9 Drawing Sheets

GAMING MACHINE CABINET COMPARTMENT WITH FRONT ACCESS STRUCTURE

TECHNICAL FIELD OF THE INVENTION

The invention relates to gaming machine cabinets, and more particularly, to arrangements for conveniently opening a gaming machine cabinet to provide access to the interior components. Aspects of the invention include gaming machine cabinets, compartments that can be arranged to provide a portion of a gaming machine cabinet, and methods of operation.

BACKGROUND OF THE INVENTION

Gaming machines found in casinos and other gaming establishments commonly include a cabinet that supports various display devices and player interface devices. The display devices may include one or more video display monitors operable to display game-related information and other information and to display games conducted at the gaming machine such as video reel-type games, video card games, and other types of wagering games. In addition to or in lieu of video display devices, gaming machines may also include mechanical reels, wheels, or other mechanical display systems to display game results. Player interface devices may include ticket or voucher printers, various control buttons, cash-in or ticket-in devices, and player card readers. Gaming machine cabinets define an interior volume for housing various internal components such as data processing devices and supporting equipment, and in some cases the mechanical reels noted above. While the interior components of the gaming machine must remain secured so as to prevent unauthorized access and tampering with the gaming machine, it is still necessary for the gaming machine cabinet to have access points to allow authorized personnel to access the interior volume of the cabinet for maintenance and service purposes.

Providing access to the interior volume of a gaming machine cabinet can be problematic. One issue arises from the fact that gaming machines are commonly arranged on the casino floor close together side-by-side and either back-to-back with other gaming machines or against a wall. This leaves the front of the gaming machine cabinet as the only exposed portion for providing access to the interior volume when the gaming machine remains in place on the casino floor. Yet in modern gaming machines, video display monitors and other electronic devices take up a substantial portion of the front surface of the gaming machine, if not the entire front surface, leaving little or no room for access without moving the video display monitors and other electronic equipment from their operating positions on the gaming machine cabinet. Moving the video display monitors from their operating position raises concerns where such devices must remain supported by the gaming machine cabinet because repositioning the devices can leave the gaming machine in danger of tipping over.

SUMMARY OF THE INVENTION

It is an object of the invention to provide gaming machine cabinet compartments having a cabinet access structure that provides superior access to the interior volume of the cabinet while the gaming machine remains installed in a bank of gaming machines or other arrangement in a casino or other gaming establishment. Although not limited to such applications, aspects of the present invention are particularly applicable to gaming machines having an upper display device such as a video display monitor for displaying various features of a wagering game, information regarding the wagering game or other information, or a combination of wagering game features and information.

In the following disclosure and claims, relative positional terms such as upper, lower, top, bottom, side, right-side, left-side, above, below, and laterally, for example, are defined with reference to the orientation of the gaming machine and gaming machine cabinet compartment shown in the figures unless specifically stated otherwise.

A gaming machine according to one aspect of the present invention includes a gaming machine cabinet including a lower compartment defining a lower compartment volume of the gaming machine and an upper compartment defining an upper compartment volume of the gaming machine. In addition to the gaming machine cabinet structures a gaming machine according to this first aspect of the invention includes one or more processing devices operable for controlling operation of the gaming machine, a player interface system operably connected the one or more processing devices, and a gaming machine display system operatively connected to the one or more processing devices.

The upper compartment defines an upper compartment front opening to the upper compartment volume and extends along an upper compartment longitudinal axis. A lift frame is mounted on the upper compartment so as to be moveable between a lift frame latched position and a lift frame raised position along a lift axis defined within the upper compartment volume. A lift frame latch operates between the lift frame and the remainder of the gaming machine cabinet and has a first lift frame latch component connected to the upper compartment and a second lift frame latch component mounted on the lift frame. The lift frame latch is operable to selectively retain the lift frame in the lift frame latched position. A pivot frame is pivotally mounted on the lift frame so as to be pivotable between a pivot frame latched position and a pivot frame raised position about a pivot axis defined at an upper end of the lift frame. An upper display panel is mounted on the pivot frame. A pivot frame latch operates between the pivot frame and lift frame to selectively retain the pivot frame in the pivot frame latched position. The pivot frame latch has a first pivot frame latch component mounted on the lift frame and a second pivot frame latch component mounted on the pivot frame.

The pivot frame and lift frame assembly in a gaming machine according to this first aspect of the invention allows the upper display panel of the gaming machine to be supported in a position in which the upper display panel may cover at least a portion of the upper compartment front opening from one lateral side of the upper compartment to the over. Specifically, when the lift frame is in the lift frame latched position and the pivot frame is in the pivot frame latched position, the upper display panel may be supported on the pivot frame so as to cover a least a portion of the upper compartment from opening. Upon release of the lift frame latch, the pivot frame and lift frame assembly together with the supported upper display panel may be lifted upwardly to reach the lift frame raised position. With the pivot frame and lift frame assembly together with the supported upper display panel raised, the pivot frame latch may be released as necessary so that the pivot frame can be pivoted to the pivot frame raised position to separate the upper display panel from the upper compartment to expose the upper compartment front opening for maintenance or other operations to the internal components of the gaming machine housed within the upper compartment.

In another aspect of the invention a gaming machine cabinet component includes a lift frame, pivot frame, lift frame latch and pivot frame latch similar to those described in connection with a gaming machine. A panel mounting structure is located on the pivot frame in gaming machine cabinet components according to this second aspect of the invention for receiving a display panel of a gaming machine. Such a gaming machine cabinet compartment may be used as an upper compartment or other compartment of the gaming machine cabinet to provide a secure but readily accessible enclosed volume for internal gaming machine components.

Another aspect of the invention includes methods for opening a gaming machine cabinet that defines a compartment volume of a gaming machine cabinet and defines a compartment front opening to the compartment volume. Methods according to this third aspect of the invention include moving a lift frame and pivot frame assembly mounted within the compartment volume upwardly from a lift frame latched position in which a gaming machine panel mounted on a pivot frame of the lift frame and pivot frame assembly covers at least a portion of the compartment front opening from a first lateral side to a second lateral side of the compartment. This upward movement of the lift frame and pivot frame assembly separates a lower edge of the gaming machine panel from a lower front element of the gaming machine cabinet. With the lift frame and pivot frame assembly moved upwardly to the lift frame raised position and with the lower edge of the gaming machine panel separated from the lower front element of the gaming machine cabinet, methods according to this third aspect of the invention include pivoting the pivot frame and gaming machine panel about a pivot axis defined at an upper end of a lift frame of the lift frame and pivot frame assembly. The pivoting separates the gaming machine panel from the upper compartment front opening to provide access to the upper compartment volume.

These and other advantages and features of the invention will be apparent from the following description of representative embodiments, considered along with the accompanying drawings.

DESCRIPTION OF REPRESENTATIVE EMBODIMENTS

Figure 1:
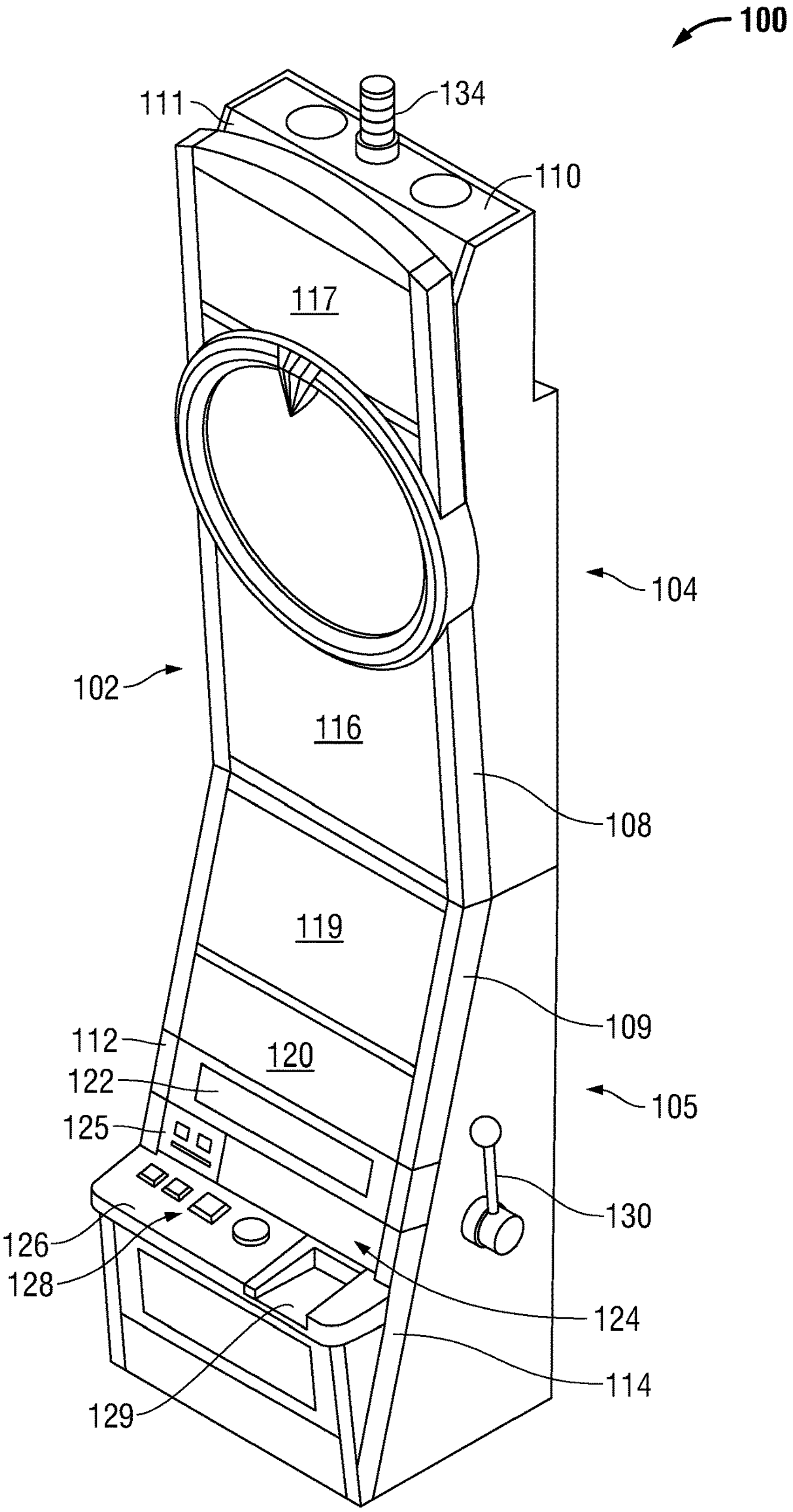
FIG. 1 is a right-side isometric view of a gaming machine according to aspects of the present invention.

Referring to FIG. 1, gaming machine 100 includes a cabinet having a front side generally shown at reference numeral 102. In this example, the cabinet includes an upper compartment shown generally at 104 and a lower compartment shown generally at 105. An upper front panel 108 of gaming machine 100 is located at a front side of upper compartment 104. As will be described further below, upper front panel 108 in its operating position shown in FIG. 1 covers a front opening of upper compartment 104 to prevent access to a volume defined by the upper compartment. In the operating position of gaming machine 100 shown in FIG. 1, a middle front panel 109 is located at a front side of lower compartment 105. This middle front panel may cover a portion of a front opening of lower compartment 105. In this example gaming machine 100, an additional front panel 112 and base front panel 114 reside below middle front panel 109. Each of these panels 112 and 114 may cover a portion of a front opening of lower compartment 105.

Each of the gaming machine front panels, upper front panel 108, middle front panel 109, additional front panel 112 and base front panel 114 in this example gaming machine 100 include various types of player interface elements of the gaming machine. For example, upper front panel 108 includes a flat-panel video display device 116 and a top flat-panel video display device 117. Middle front panel 109 in this example includes a flat-panel video display device 119 and a clear or selectively light-transmissive panel 120 located to provide a line of sight to mechanical reels (not shown in FIG. 1) housed in lower compartment 105. Additional front panel 112 includes an additional flat-panel video display device 122 and may include speaker grilles (not shown) aligning with speakers (also not shown) housed in lower compartment 105. Base front panel 114 in this example gaming machine 100 provides space 124 for various player interface devices such as a player card reading module 125 and other devices, and also includes a button deck 126 on which various buttons 128 and a ramp 129 to a currency or voucher/ticket reader are located. It should also be noted that each display device referenced herein may include any suitable display device including a liquid crystal display, plasma display, LED display, OLED display or any other type of display device currently known or that may be developed in the future. Generally, the display device or display devices of the gaming machine and any mechanical display arrangement such as mechanical reels may be described in this disclosure and the accompanying claims as a “display system” of the gaming machine. The term “display” when not used to qualify a term such as “device,” “apparatus,” or “system,” for example, may be used in this disclosure and accompanying claims to refer to an arrangement of one or more graphic elements shown by a display device or to the act of displaying such graphic elements by a display device unless explicitly indicated otherwise. It should also be noted that some of the front panels shown in FIG. 1, including at least a portion of upper front panel 108, may include a static display panel (with no video display capability) rather than the illustrated video display devices 116 and 117.

The mechanical buttons 128 mounted on button deck 126 and the side-mounted lever 130 are shown only for example in FIG. 1. Alternatively or in addition to mechanical buttons 128 and lever 130, a touch-screen panel may be included on button deck 126 to implement touch-screen control buttons. Touch-screen controls may also be implemented on other display devices of the gaming machine. Other forms of gaming machines through which the invention may be implemented may include switches, joysticks, or other mechanical input devices in addition to the mechanical buttons 128 or any touch-screen controls. The player interface devices that receive player inputs in the course of a game played through the gaming machine, such as controls to select a wager amount for a given play, controls to enter a play input to actually start a given play in the game, or controls to allow a player to make other player inputs in a game implemented through gaming machine 100, may be referred to generally as a "player input system."

Figure 2:
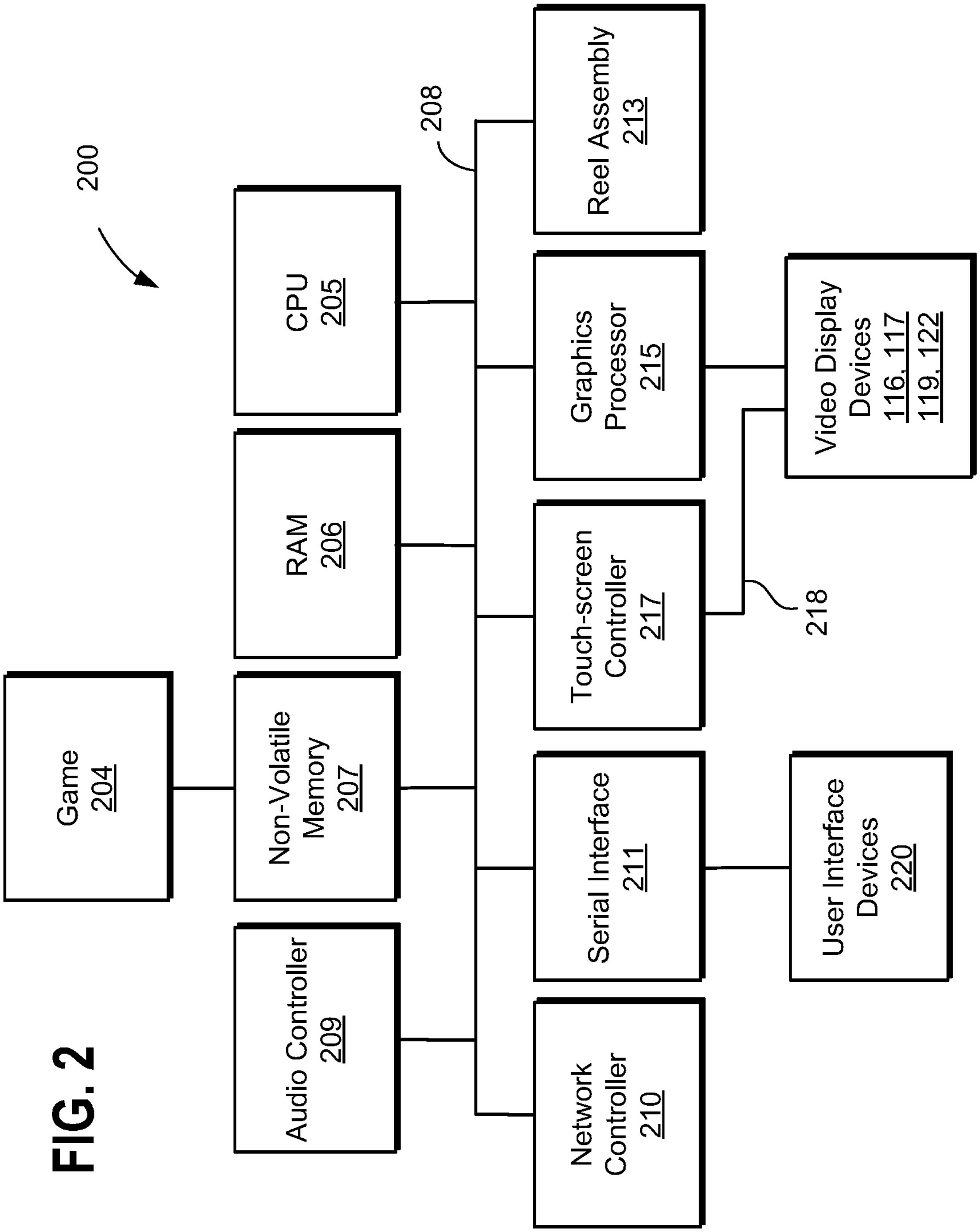
FIG. 2 is a block diagram showing the various components that may be included in the gaming machine shown in FIG. 1.

FIG. 2 shows a logical and hardware block diagram 200 of gaming machine 100 that includes a processor (CPU) 205 along with random access memory (RAM) 206 and nonvolatile memory or storage device 207 that may store game software 204. All of these devices are connected on a system bus 208 with an audio controller device 209, a network controller 210, and a serial interface 211. A graphics processor 215 is also connected on bus 208 and is connected to drive video display devices 116, 117, 119, and 122 (all mounted on the gaming machine cabinet including upper and lower compartments 104 and 105 as shown in FIG. 1). As shown in FIG. 2, gaming machine 100 also includes a touch-screen controller 217 connected to system bus 208. Touch-screen controller 217 is also connected via signal path 218 to receive signals from a touch-screen element associated with video display device 119 or other touch-screen button panel of gaming machine 100 or both. It will be appreciated that the touch-screen element itself typically comprises a thin film that is secured over the display surface of the respective display device such as the display device 119 in FIG. 1. The touch-screen element itself is not illustrated or referenced separately in the figures. The present invention is not limited to any particular touch-screen technology.

Those familiar with data processing devices and systems will appreciate that other basic electronic components will be included in gaming machine 100 such as a power supply, cooling systems for the various system components, audio amplifiers, and other devices that are common in gaming machines. These additional devices are omitted from the drawings so as not to obscure the present invention in unnecessary detail.

All of the elements 205, 206, 207, 208, 209, 210, and 211 shown in FIG. 2 are elements commonly associated with a personal computer, although they may be specially designed and configured for use in a wagering game environment. These elements may be mounted on (or connected to) a motherboard and housed in a personal computer housing that itself may be mounted in the gaming machine cabinet including upper compartment 104 and lower compartment 105 shown in FIG. 1. Alternatively, the various electronic components may be mounted on one or more circuit boards housed within the gaming machine cabinet without a separate enclosure such as those found in personal computers. Those familiar with data processing systems and the various data processing elements shown in FIG. 2 will appreciate that many variations on this illustrated structure may be used within the scope of the present invention. For example, since serial communications are commonly employed to communicate with a touch-screen controller such as touch-screen controller 217, the touch-screen controller may not be connected on system bus 208, but instead include a serial communications line to serial interface 211, which may be a USB controller for example. It will also be appreciated that some of the devices shown in FIG. 2 as being connected directly on system bus 208 may in fact communicate with the other system components through a suitable expansion bus. Audio controller 209, for example, may be connected to the system via a PCI or PCIe bus or bus configured according to some other expansion bus standard. System bus 208 is shown in FIG. 2 merely to indicate that the various components are connected in some fashion for communication with CPU 205 and is not intended to limit the invention to any particular bus architecture.

Numerous other variations in the gaming machine internal structure and system may be used without departing from the principles of the present invention. For example, a gaming machine in some embodiments of the present invention may rely on one or more data processors located remotely from the gaming machine itself. Embodiments of the present invention may include no processor such as CPU 205 or graphics processor such as 215 at the gaming machine and may instead rely on one or more remote processors. Thus unless specifically stated otherwise, the designation "gaming machine" is used in this disclosure and the accompanying claims to designate a system of devices that operate together to provide the indicated functions. A "gaming machine" may include a gaming machine such as gaming machine 100 shown in FIGS. 1 and 2, which is itself a system of various components, and may also include one or more components remote from a gaming machine cabinet (that is, the cabinet including compartments 104 and 105 in FIG. 1). Thus the designation "gaming machine" encompasses both a stand-alone gaming machine and a gaming machine (that is, the part housed in a cabinet such as the cabinet in FIG. 1) along with one or more remote components for providing various functions (such as identifying prizes for a given play, controlling the display system, and performing other operations in the course of a game).

It will also be appreciated that graphics processors are also commonly a part of modern computer systems. Although separate graphics processor 215 is shown for controlling video display devices 116, 117, 119, and 122, CPU 205 or a graphics processor packaged with or included with CPU 205 may control all of the display devices directly without any separately packaged graphics processor. The invention is not limited to any particular arrangement of processing devices for controlling the video display devices included with gaming machine 100. Also, a gaming machine implementing the present invention is not limited to any particular number of video display devices or other types of display devices and to any particular number of graphics processors configured to drive the various video display devices.

It should be noted that the invention is not limited to gaming machines employing the personal computer-type arrangement of processing devices and interfaces shown in example gaming machine 100. Other gaming machines through which the invention may be implemented may include one or more special purpose processing devices to perform the various processing steps for implementing the invention. Unlike general purpose processing devices such as CPU 205, which may comprise an Intel® or AMD® processor for example, these special purpose processing devices may not employ operational program code to direct the various processing steps.

The example gaming machine 100 is shown in FIG. 2 as including user interface devices 220 (part of a player input system) connected to serial interface 211. These user interface devices may include various player input devices such as mechanical buttons 128, virtual buttons shown on a touch-screen button panel, and/or levers, and other devices. It will be appreciated that the interface between CPU 205 and other player input devices such as player card readers, voucher readers or printers, and other devices may be in the form of serial communications. Thus serial interface 211 may be used for those additional devices as well, or the gaming machine may include one or more additional serial interface controllers. However, the interface between peripheral devices in the gaming machine, such as player input devices, is not limited to any particular type or standard for purposes of the present invention.

Reel assembly 213 is shown in the diagrammatic representation of FIG. 2 to illustrate that mechanical reels may be visible through panel 120. The mechanical reels represent a display device for displaying various game symbols in the course of controlling the gaming machine. Although the invention is not limited to any particular mechanical reel arrangement or control system, mechanical reels may be controlled conveniently through serial communications that provide instructions for a respective stepper motor for each reel. Thus some embodiments of the present invention employing mechanical reels may use a serial interface device such as serial interface 211 to control communications with the reel assembly, and may not include a direct bus interconnection as indicated by FIG. 2.

Figure 3:
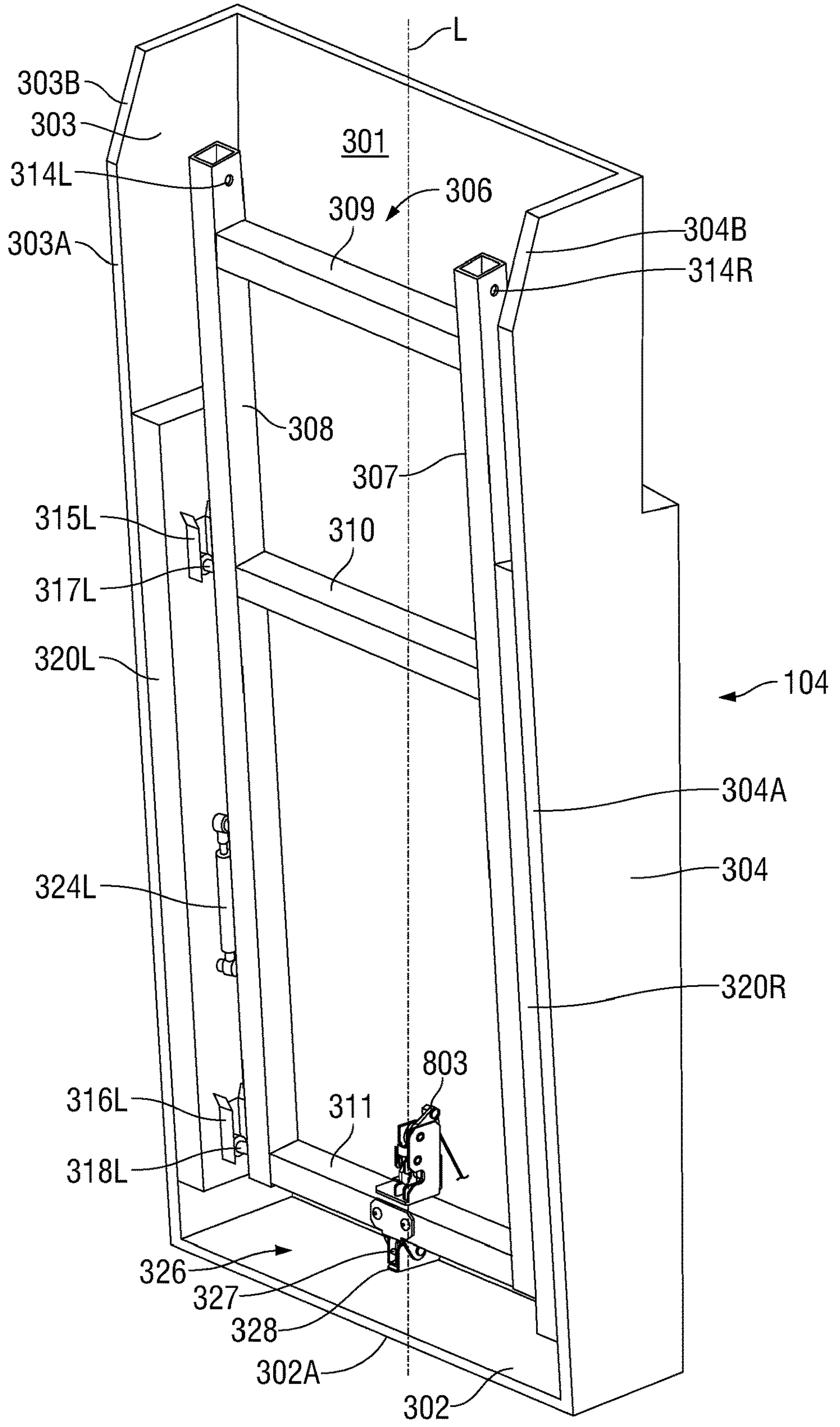
FIG. 3 is a right-side isometric view of the upper compartment of the gaming machine shown in FIG. 1, separated from the remainder of the gaming machine and with the pivot frame and upper display panel removed to expose the upper compartment volume, the upper compartment front opening, and the lift frame in the lift frame latched position.

FIG. 3 shows upper compartment 104 separated from the remainder of the gaming machine 100 known in FIG. 1. In this example, upper compartment 104 includes a back wall 301, a bottom wall 302, a left-side wall 303, and a right-side wall 304, and extends along a longitudinal axis L. The volume between these walls defines generally an upper compartment volume with a front opening to this volume defined by front edges of the walls, namely, bottom front edge 302A, left-side front edge 303A, and right-side front edge 304A. In this example, compartment 104 further includes an angled upper left front edge 303B and an angled upper right front edge 304B. As shown in the isometric view of FIG. 1, a top panel 110 is adapted to cover the top part of upper compartment 104 with top panel surface 111 forming an angled plane. This angled plane will be discussed further below the content connection particularly with FIGS. 9 through 11.

Figure 4:
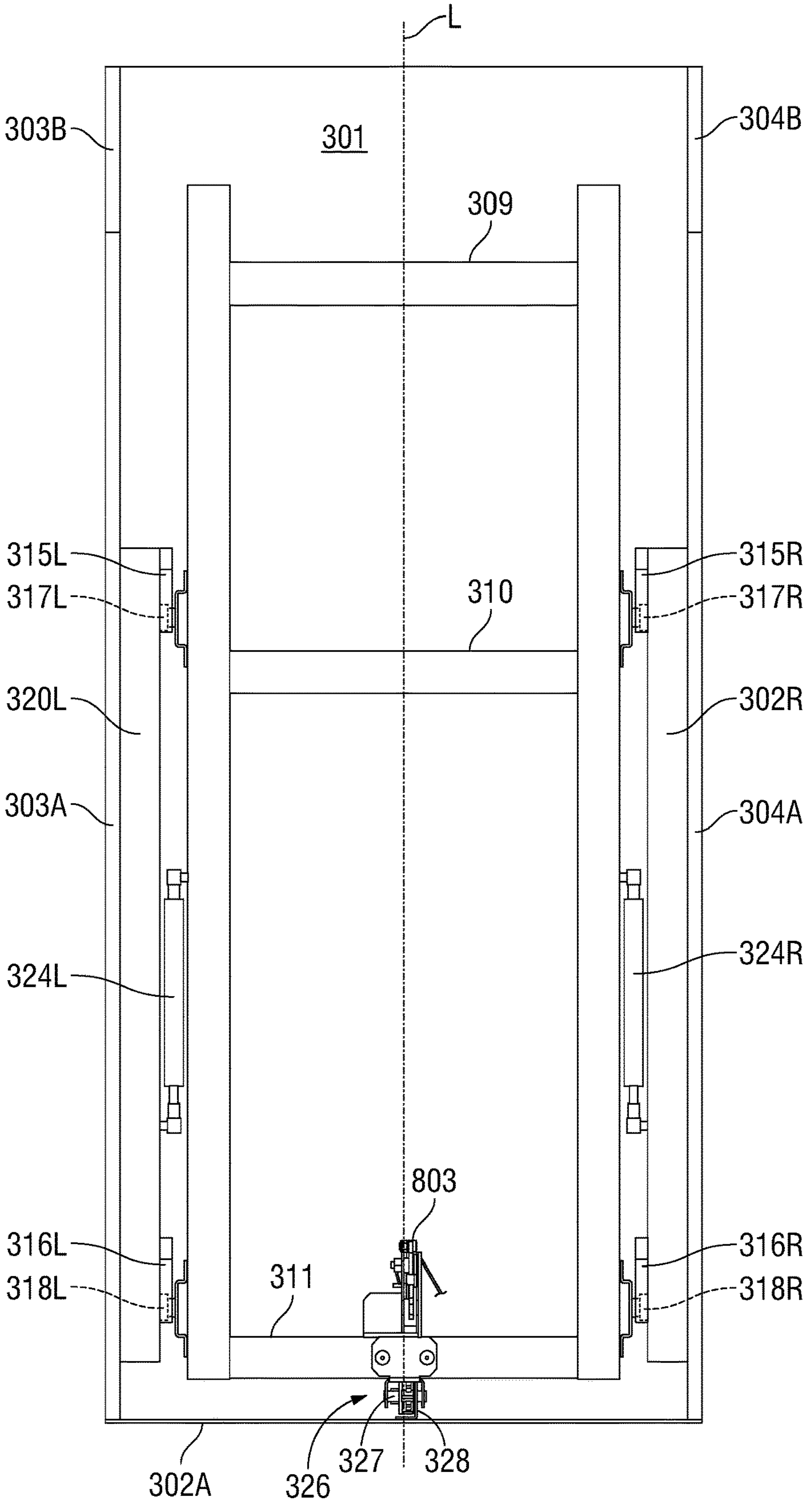
FIG. 4 is a front view of the upper compartment shown in FIG. 3.
Figure 5:
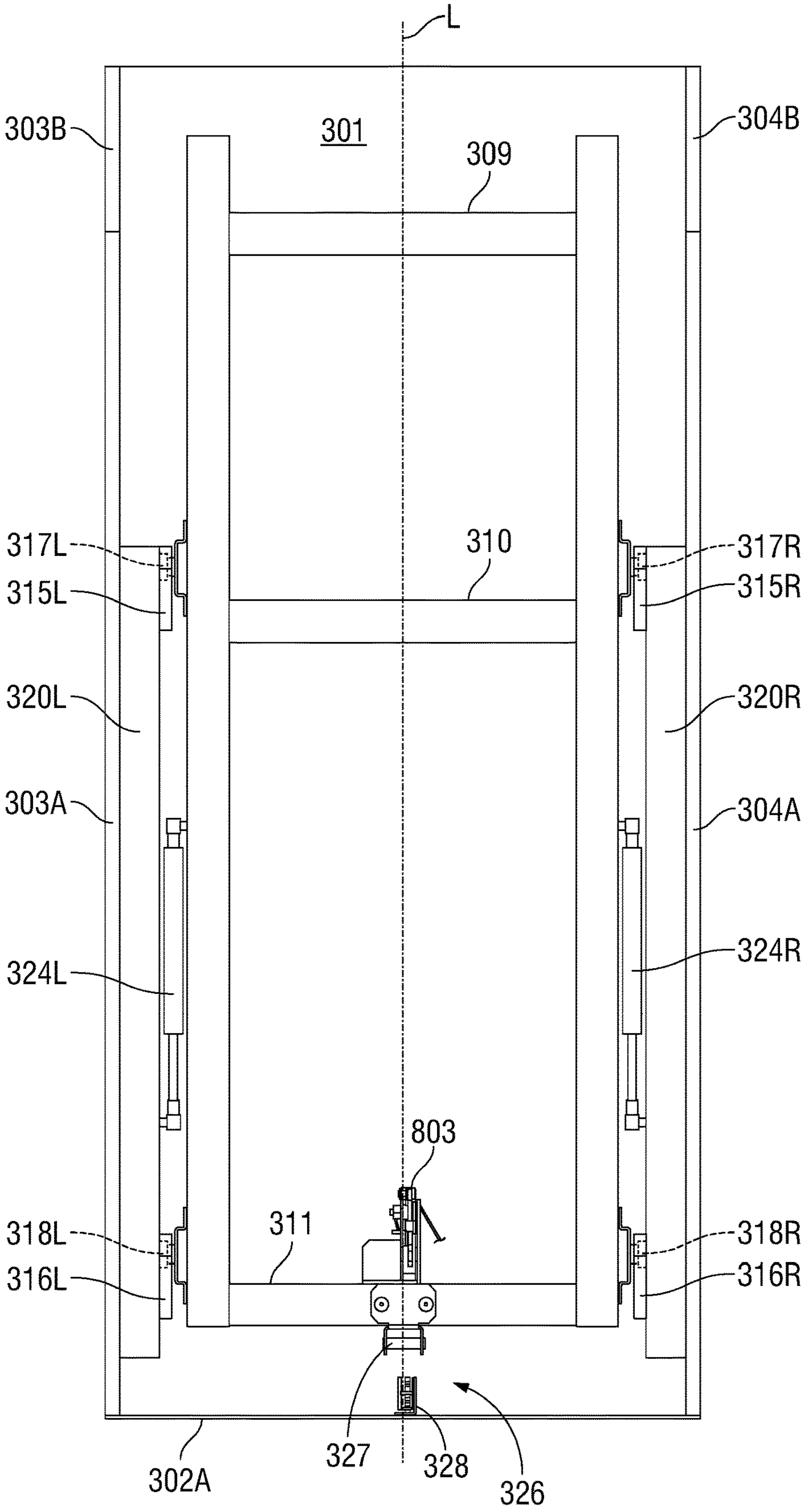
FIG. 5 is a front view similar to FIG. 4 but showing the lift frame in the lift frame raised position.

Referring again to FIG. 3, the volume defined by upper compartment 104 houses a lift frame 306 made up of a right-side frame member 307, a left-side lift frame member 308, and three crossmembers including upper crossmember 309, intermediate crossmember 310, and lower crossmember 311. Lift frame 306 is mounted in upper compartment 104 to be movable along a lift axis F (shown in the side view of FIG. 10) between a lift frame latched position (shown in FIGS. 3 and 4) and a lift frame raised position (shown in FIGS. 5-8). To facilitate this movement between the lift frame latched position and lift frame raised position, the apparatus includes a left-side lift structure and a right-side lift structure, with the left-side lift structure being visible in the perspective of FIG. 3 and both lift structures being visible in the front view of FIGS. 4 and 5. In this example embodiment, the left-side lift structure includes two pins or rollers 317L and 318L extending laterally from left-side frame member 308 and two tracks 315L and 316L mounted on upper compartment side wall 303 via a mounting bracket 320L. The right-side lift structure in the example embodiment includes a corresponding arrangement of two pins or rollers 317R and 318R extending laterally from right-side member 307 and tracks 315R and 316R mounted on upper compartment side wall 304 via a mounting bracket 320R. The distance along longitudinal axis L between the lift frame latched position perhaps shown best in FIG. 4 and lift frame raised position shown in FIG. 5 is a relatively short distance and in this example is defined essentially by the length of the four tracks 315L, 316L, 315R, and 316R. FIGS. 4 and 5 also show lift support struts 324L and 324R are provided in this embodiment on both the left and right sides of lift frame 306. Lift support struts 324L and 324R may be gas and/or spring-operated struts that provide sufficient force to hold the lift frame 306 and material mounted on the lift frame in a desired position above the lift frame latched position as will be described further below.

Figure 6:
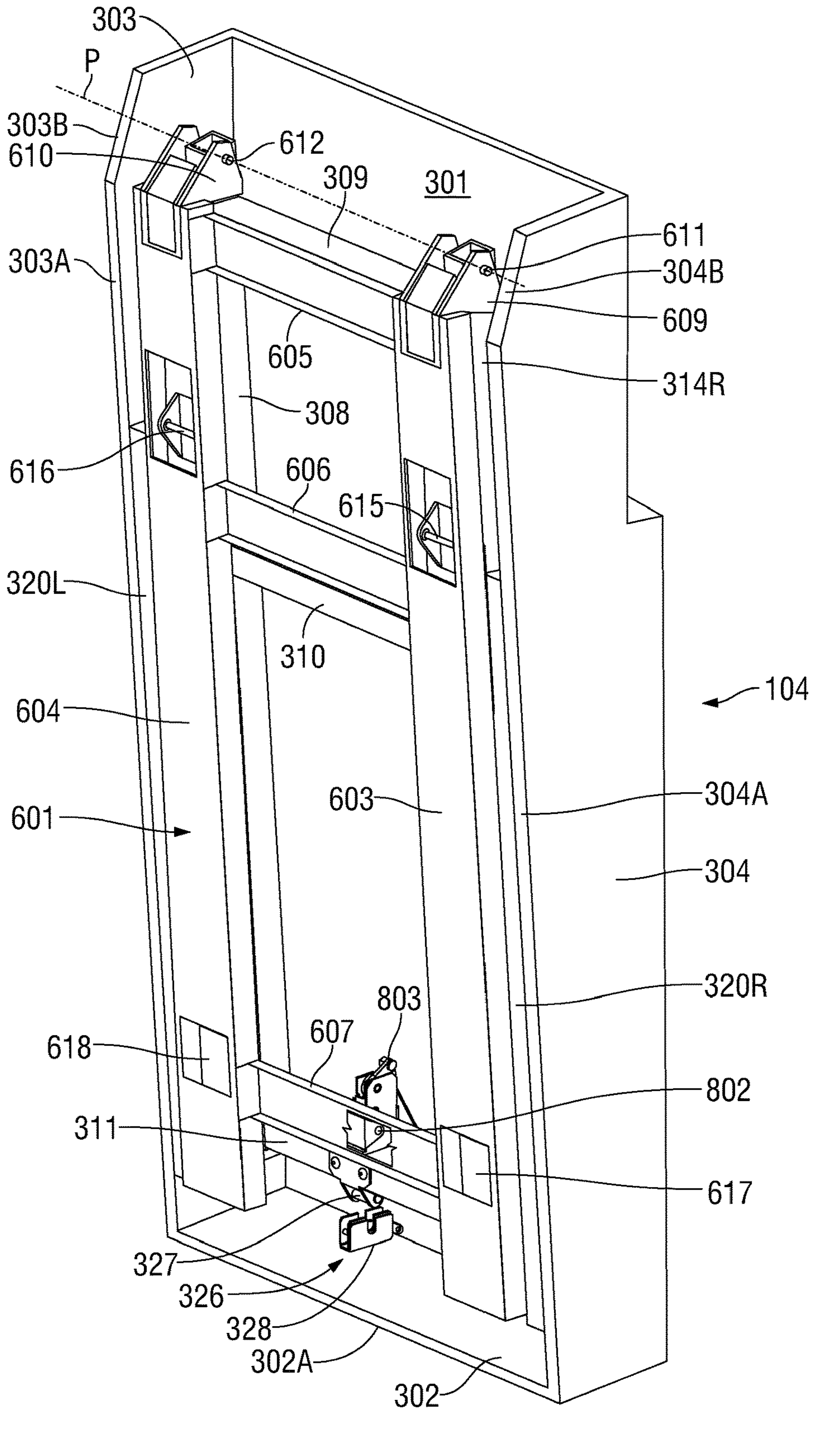
FIG. 6 is a right-side isometric view of the upper compartment similar to FIG. 3 but showing the lift frame in the lift frame raised position and the pivot frame connected to the lift frame and in the pivot frame latched position with a portion of the pivot frame broken away to show a portion of the pivot frame latch.
Figure 7:
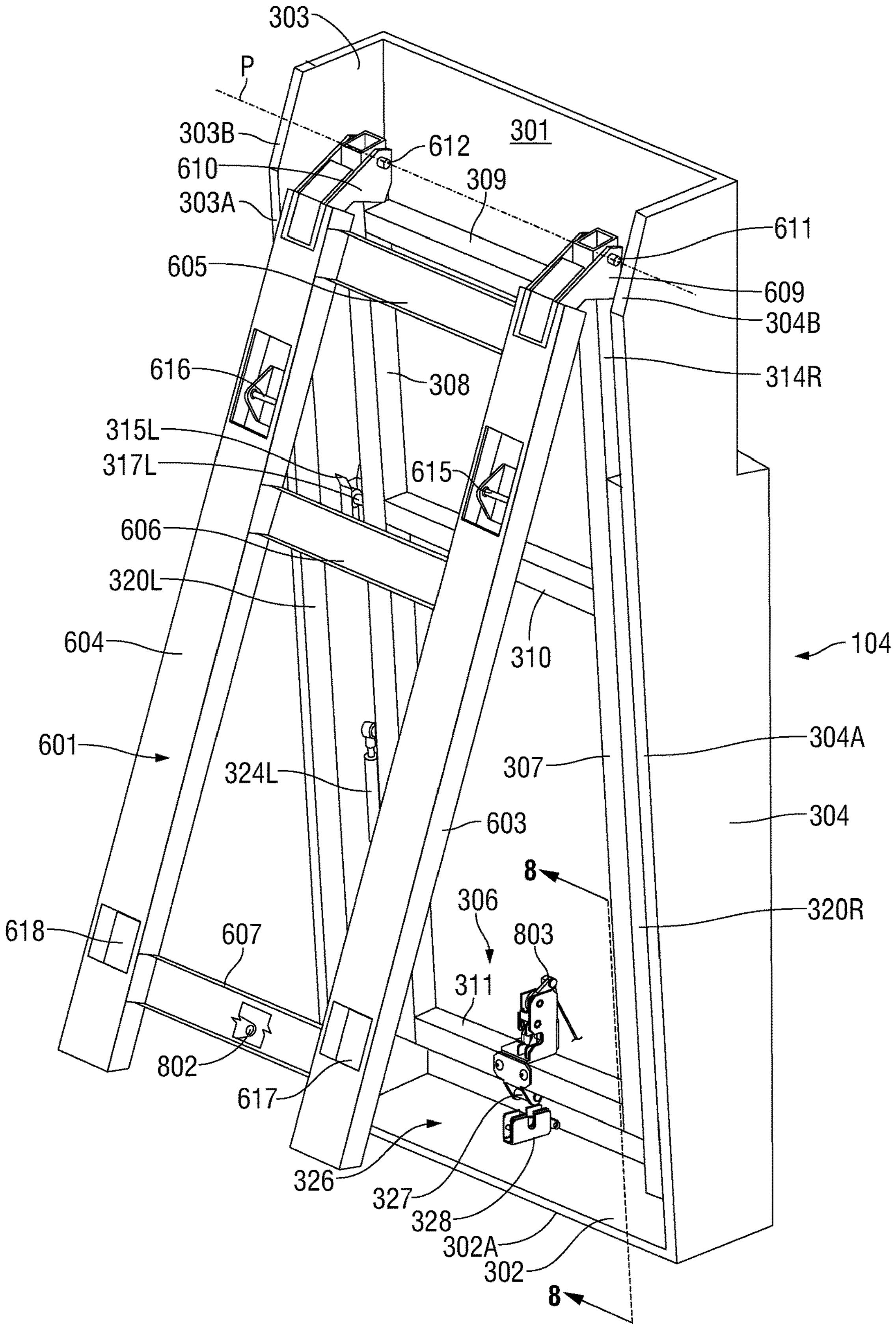
FIG. 7 is a right-side isometric view of the upper compartment similar to FIG. 6 but showing the pivot frame in the pivot frame raised position.
Figure 8:
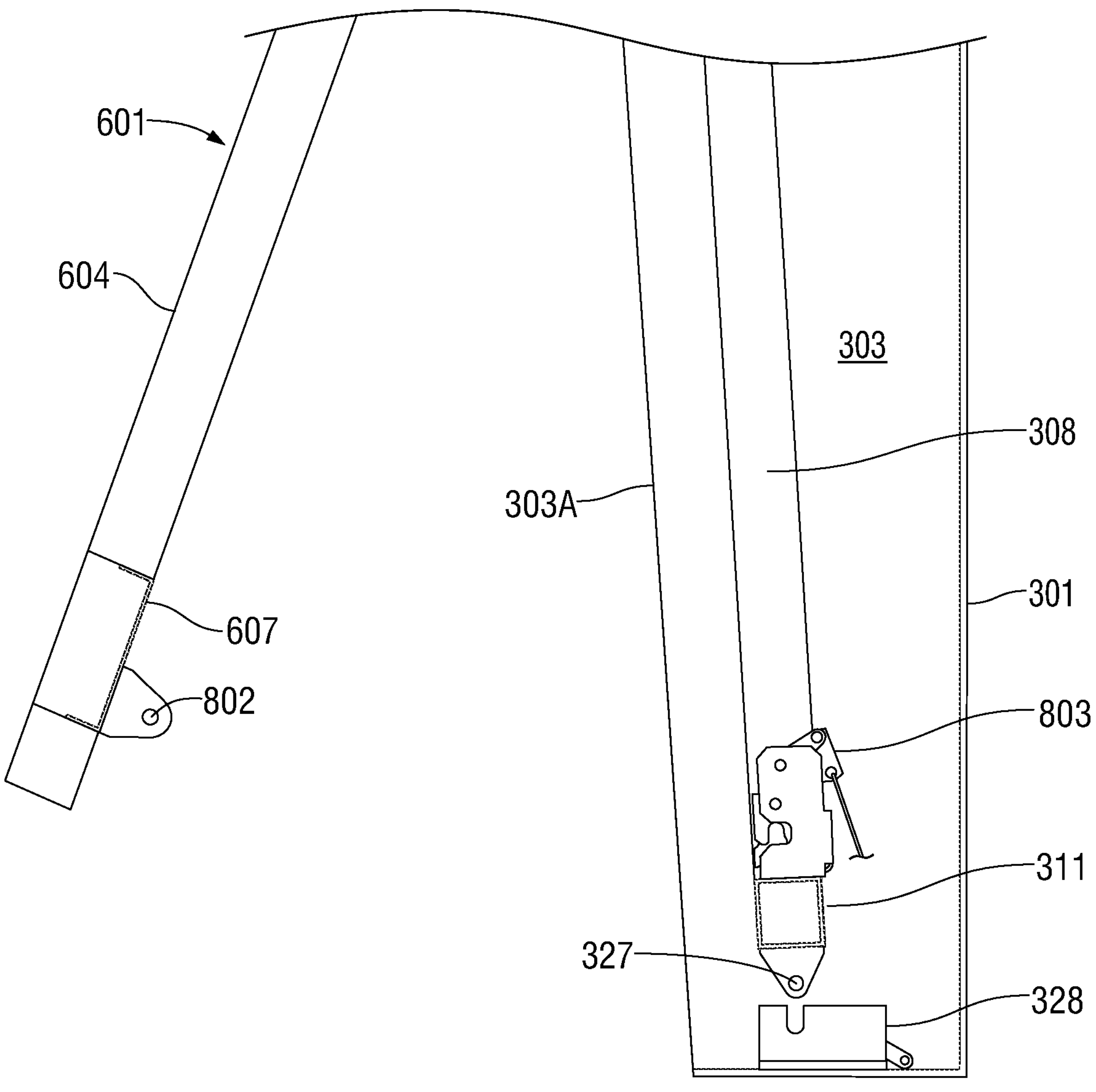
FIG. 8 is partial section view along the line 8-8 in FIG. 7.

As shown in FIGS. 6 through 8, the apparatus also includes a pivot frame 601 mounted on lift frame 306 to form a lift frame and pivot frame assembly. This example pivot frame 601 includes a right-side pivot frame member 603, a left-side pivot frame member 604, and three crossmembers including an upper crossmember 605, an intermediate crossmember 606, and a lower crossmember 607. A pivot connection bracket 609 is included at the upper end of right-side pivot frame member 603 a pivot bracket 610 and is mounted at the upper end of left-side pivot frame member 604. Pivot bracket 609 supports a pivot member 611 received in an opening 314R of the lift frame while pivot bracket 610 supports a pivot member 612 received in an opening 314L of the lift frame (openings 314R and 314L being shown in FIG. 3). This pivot structure allows pivot frame 601 to pivot about a pivot axis P with respect to lift frame 306 from a pivot frame latched position shown in FIG. 6 to a pivot frame raised position shown in FIG. 7. In the pivot frame raised position shown in FIG. 7, a support rod (not shown) may be positioned to extend from a part of lift frame 306, such as crossmember 310 for example, to a part of pivot frame 601, such as a suitable feature on crossmember 606 for example, to retain pivot frame 601 in the pivot frame raised position.

The embodiment shown in FIGS. 3 through 8 includes two separate latches associated with the lift frame 306 and pivot frame 601 assembly. A lift frame latch shown generally at 326 in FIGS. 3 and 4 includes a first component with a latch bar 327 mounted on lower lift frame crossmember 311 and a second component including a latch mechanism 328 mounted on lower wall 302 of upper compartment 104. A pivot frame latch is shown best in the section view of FIG. 8 and includes a first component with a latch bar 802 mounted on pivot frame lower crossmember 607 and a second component with a latch mechanism 803 mounted on lower crossmember 311 of lift frame 306. Lift frame latch 326 is operable to selectively retain lift frame 306 in the lift frame latched position shown in FIGS. 3 and 4 by capturing latch bar 327 in latch mechanism 328. Pivot frame latch 801 is operable to selectively retain pivot frame 601 in the pivot frame latched position shown in FIG. 6 by capturing latch bar 802 in latch mechanism 803. Lift frame latch 326 is operable by a mechanism not shown in detail to allow latch bar 327 to be released from latch mechanism 328 so that lift frame 306 may be raised to the raised position shown in 6 through 8. Similarly, the pivot frame latch is operable by a mechanism not shown in detail to allow latch bar 802 to be released from latch mechanism 803 to allow pivot frame 601 to be pivoted to the pivot frame raised position shown in FIGS. 7 and 8.

Pivot frame 601 also includes a panel mounting structure for receiving a display panel of a gaming machine, and particularly upper display panel 108 shown in FIG. 1. In this embodiment, the panel mounting structure includes a right-side support bar 615 located within an opening in pivot frame member 603 and a left-side support bar 616 located within an opening within left-side pivot frame member 604. The panel mounting structure in this example further includes receiving opening 617 toward the lower end of pivot frame member 603 and receiving opening 618 toward the lower end of pivot frame member 604. This particular panel mounting structure is configured to cooperate with features on the back of panel 108 to position and retain the panel on pivot frame 601. In particular, the features on the back of panel 108 may include right and left-side hooks (not shown) that hook on support bars 615 and 616 and suitable features may protrude into the openings 617 and 618 in position to be secured by suitable fasteners or latching elements (not shown) at the lower end of pivot frame 601.

Figure 9:
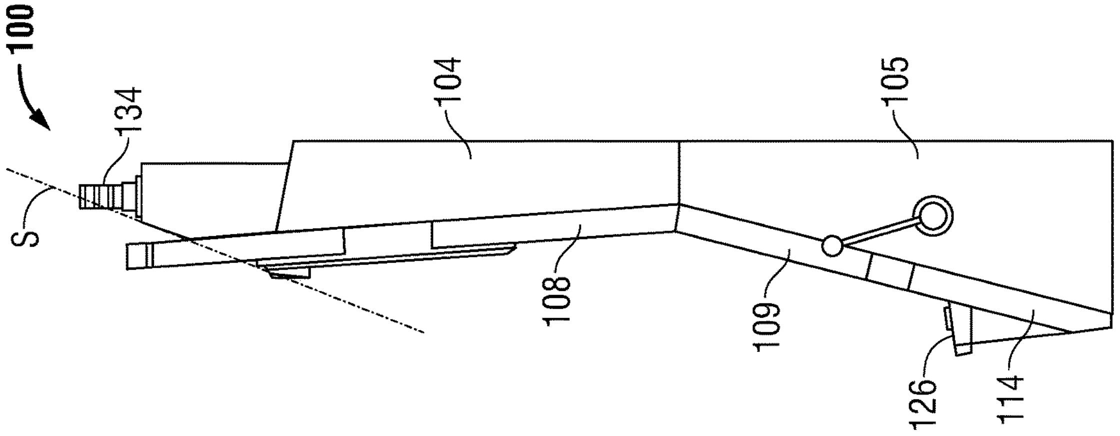
FIG. 9 is a side view of the gaming machine shown in FIG. 1.

The operation of a gaming machine cabinet component in accordance with the present invention may now be described with reference to the figures and particularly to the side views of FIGS. 9 through 11. FIG. 9 shows the condition of gaming machine 100 in which panel 108 is in its operating position covering the front opening of compartment 104 (the front opening being defined by front edges 302A, 303A, and 304A shown best in FIG. 3). This covering of the front opening of compartment 104 is also apparent from the isometric view of FIG. 1 which shows the state of the gaming machine 100 corresponding to the side view of FIG. 9. In this position, panel 108 is mounted on the pivot frame 601 shown in FIGS. 6 through 8 and pivot frame 601 is in its latched position as is lift frame 306.

From the position shown in FIG. 9, lift frame latch 326 shown best in FIG. 3 is operated to release lift frame 306 so that the lift frame together with pivot frame 601 and panel 108 may be lifted upwardly to the lift frame raised position. A side view of this lift frame raised position and lift axis F is shown in FIG. 10. From this point shown in FIG. 10, the pivot frame latch made up of bar 802 and latch mechanism 803 shown in FIG. 8 may be operated to release pivot frame 601 so that the pivot frame may be moved from the pivot frame latched position shown in FIG. 6 to the pivot frame raised position shown in FIGS. 7 and 8. This pivot frame raised position corresponds to the position shown in FIG. 11. It will be appreciated in this position shown in FIG. 11, panel 108 is removed from the front opening of compartment 104. Thus in this position shown in FIG. 11, the arrangement allows access to the interior volume of compartment 104 through the front opening (defined by edges 302A, 303A, and 304A shown in FIG. 3) and also allows access to the back of panel 108.

Figure 11:
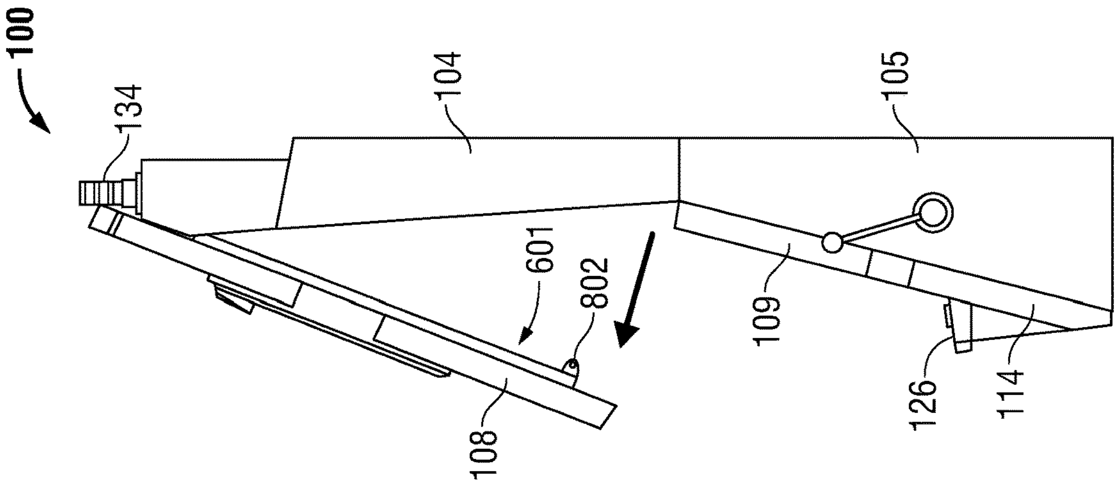
FIG. 11 is a side view similar to FIG. 10 but showing the position of the upper display panel when the lift frame is in the lift frame raised position and the pivot frame is in the pivot frame raised position.
Figure 10:
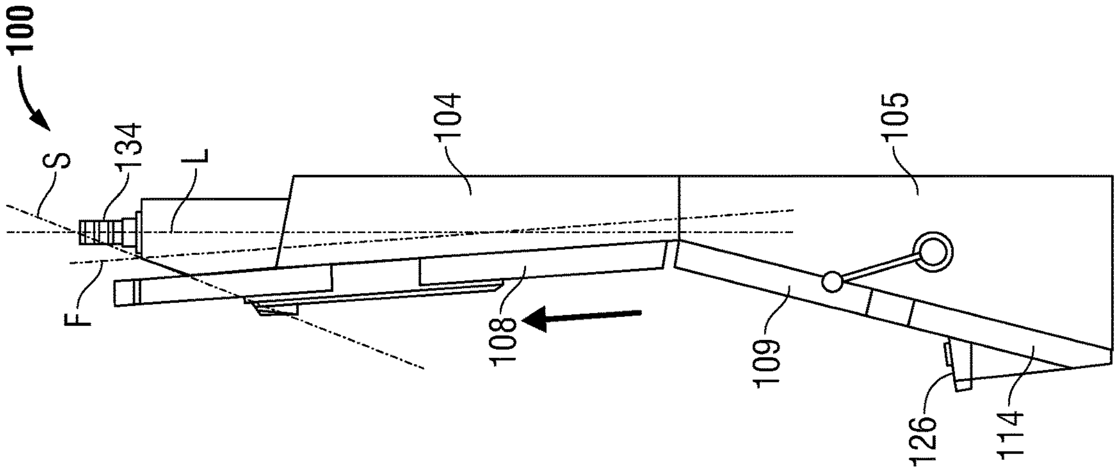
FIG. 10 is a side view similar to FIG. 9 but showing the position of the upper display panel when the lift frame is in the lift frame raised position and the pivot frame is in the pivot frame latched position.

Comparing FIGS. 9 and 10 with FIG. 11, it will be appreciated that the plane S defined by surface 111 shown in FIG. 1 sets a maximum angle at which pivot frame 601 and panel 108 may be pivoted with respect to lift frame 306 contained in compartment 104. This may be an angle selected to protect a candle light such as the candle light 134 shown in FIGS. 1 and 9 through 11.

It should be appreciated that the particular embodiment shown in the figures is merely an example of a gaming machine and gaming machine compartment within the scope of the present invention and that many variations in the structure are possible without departing from the scope set forth in the following claims. For example, numerous variations are possible for both the lift frame latch 326 and pivot frame latch. In one variation, the pivot frame latch may comprise a lower edge or other structure of the panel (such as panel 108) mounted on the pivot frame or structure on the pivot frame itself that resides behind an upper part of a lower adjacent panel (such as panel 109) as to capture that lower edge or structure when the pivot frame and lift frame are in the latched, lowermost position. This capture of the panel mounted on the pivot frame or the pivot frame itself when the lift frame is in its latched, lowermost position may prevent pivot frame from being pivoted upwardly about its pivot axis (such as P in FIGS. 6 and 7) and effectively lock the pivot frame and the panel mounted thereon in the closed position blocking access to the volume of the compartment that houses the lift frame and pivot frame. In this variation, the first pivot frame latch component connected to the lift frame would comprise the capturing structure while the second pivot frame latch component mounted on the pivot frame would be the captured structure. This variation of the pivot frame latch is released simply by moving the lift frame and thus pivot frame and mounted panel upwardly so that the lower panel edge or other previously captured structure is no longer captured and the pivot frame can be pivoted about its pivot axis. More generally, the lift frame latch may comprise any structure capable of selectively locking the lift frame in the latched, lowermost position and the pivot frame latch may comprise any structure capable of selectively locking the pivot frame in the pivot frame latched, pivoted closed position.

Similarly, numerous variations are possible in the structure facilitating the pivoting of the pivot frame about its pivot axis and the movement of the lift frame along its lift axis. For example, although the movement facilitating structures (tracks 315L, 315R, 316L, and 316R and pins/rollers 317L, 317R, 318L, and 318R) are shown in the illustrated example as being located at the lateral sides of lift frame 306, these elements or other movement facilitating elements may be mounted at the back of lift frame 306 and inside surface of back wall 301. It is also possible in any case for there to be a single tack and single pin or roller arrangement rather than the multiple tracks (315L and 316L for example) and multiple pins/rollers (317L and 318L for example). More generally, the structure for facilitating the movement of lift frame 306 along the lift frame axis F in FIG. 10 and the structure for facilitating the pivoting of pivot frame 601 about pivot axis P in FIGS. 6 and 7 may comprise any suitable structures for facilitating that movement.

Numerous variations are also possible in the structure of the lift frame and pivot frame. Although the example lift frame 306 and example pivot frame 601 have essentially a ladder-type frame structure, any suitable structural arrangement may be used for these frames.

As used herein, whether in the above description or the following claims, the terms "comprising," "including," "carrying," "having," "containing," "involving," and the like are to be understood to be open-ended, that is, to mean including but not limited to. Also, it should be understood that the terms "about," "substantially," and like terms used herein when referring to a dimension or characteristic of a component indicate that the described dimension/characteristic is not a strict boundary or parameter and does not exclude variations therefrom that are functionally similar. At a minimum, such references that include a numerical parameter would include variations that, using mathematical and industrial principles accepted in the art (e.g., rounding, measurement or other systematic errors, manufacturing tolerances, etc.), would not vary the least significant digit.

Any use of ordinal terms such as "first," "second," "third," etc., in the following claims to modify a claim element does not by itself connote any priority, precedence, or order of one claim element over another, or the temporal order in which acts of a method are performed. Rather, unless specifically stated otherwise, such ordinal terms are used merely as labels to distinguish one claim element having a certain name from another element having a same name (but for use of the ordinal term).

The term "each" may be used in the following claims for convenience in describing characteristics or features of multiple elements, and any such use of the term "each" is in the inclusive sense unless specifically stated otherwise. For example, if a claim defines two or more elements as "each" having a characteristic or feature, the use of the term "each" is not intended to exclude from the claim scope a situation having a third one of the elements which does not have the defined characteristic or feature.

The above-described embodiments are intended to illustrate the principles of the invention, but not to limit the scope of the invention. Various other embodiments and modifications to these representative embodiments may be made by those skilled in the art without departing from the scope of the present invention. For example, in some instances, one or more features disclosed in connection with one embodiment can be used alone or in combination with one or more features of one or more other embodiments. More generally, the various features described herein may be used in any working combination.

The invention claimed is:

1. A gaming machine including:

(a) a lower compartment defining a lower compartment volume of the gaming machine;

(b) one or more processing devices operable for controlling operation of the gaming machine, a player interface system operably connected the one or more processing devices, and a gaming machine display system operatively connected to the one or more processing devices, the gaming machine display system including an upper display panel;

(c) an upper compartment defining an upper compartment volume of the gaming machine and defining an upper compartment front opening to the upper compartment volume, the upper compartment extending along an upper compartment longitudinal axis;

(d) a lift frame mounted on the upper compartment so as to be moveable between a lift frame latched position and a lift frame raised position along a lift axis defined within the upper compartment volume;

(e) a lift frame latch having a first lift frame latch component connected to the upper compartment and a second lift frame latch component mounted on the lift frame, the lift frame latch being operable to selectively retain the lift frame in the lift frame latched position;

(f) a pivot frame pivotally mounted on the lift frame so as to be pivotable between a pivot frame latched position and a pivot frame raised position about a pivot axis defined at an upper end of the lift frame, the upper display panel being mounted on the pivot frame; and (g) a pivot frame latch having a first pivot frame latch component connected to the lift frame and a second pivot frame latch component mounted on the pivot frame, the pivot frame latch being operable to selectively retain the pivot frame in the pivot frame latched position.

2. The gaming machine of claim 1 wherein the upper display panel covers at least a portion of the upper compartment front opening when the lift frame is in the lift frame latched position and the pivot frame is in the pivot frame latched position and wherein a lower end of the pivot frame pivots away from the lift frame in an arc about the pivot axis as the pivot frame is moved from the pivot from latched position to the pivot frame raised position.

3. The gaming machine of claim 1 further including:

(a) a right-side lift structure having a first component mounted on a right-side member of the lift frame and a second component mounted on a right-side wall of the upper compartment; and (b) a left-side lift structure having a first component mounted on a left-side member of the lift frame and a second component mounted on a left-side wall of the upper compartment, the right-side lift structure and the left-side lift structure cooperating to facilitate the movability of the lift frame between the lift frame latched position and the lift frame raised position.

4. The gaming machine of claim 1 wherein:

(a) the pivot frame includes a right-side pivot frame member, a left-side pivot frame member; and a cross-member arrangement connecting the right-side pivot frame member and the left-side pivot frame member; and (b) the right-side pivot frame member includes a right-side pivot element providing a pivot connection to the right-side member of the lift frame and the left-side pivot frame member includes a left-side pivot element providing a pivot connection to the left-side member of the lift frame.

5. The gaming machine of claim 1 further including a support system operating between the lift frame and the upper compartment to retain the lift frame in a given position along the lift axis between the lift from latched position and the lift frame raised position.

6. The gaming machine of claim 1 further including an angled panel at an upper end of the upper compartment, the angled panel extending in a plane forming an acute angle with the upper compartment longitudinal axis the acute angle defining a maximum pivot angle of the pivot frame raised position relative to the upper compartment longitudinal axis.

7. The gaming machine of claim 1 wherein the pivot frame is pivotally mounted on the lift frame so that the pivot axis is located at an uppermost end of the pivot frame.

8. A gaming machine cabinet component including:

(a) a compartment defining a compartment volume and defining a compartment front opening to the compartment volume, the compartment extending along a compartment longitudinal axis;

(b) a lift frame mounted on the compartment so as to be moveable between a lift frame latched position and a lift frame raised position along a lift axis defined within the compartment volume;

(c) a lift frame latch having a first lift frame latch component mounted on the compartment and a second lift frame latch component mounted on the lift frame, the lift frame latch being operable to selectively retain the lift frame in the lift frame latched position;

(d) a pivot frame pivotally mounted on the lift frame so as to be pivotable between a pivot frame latched position and a pivot frame raised position about a pivot axis defined at an upper end of the lift frame;

(e) a pivot frame latch having a first pivot frame latch component mounted on the lift frame and a second pivot frame latch component mounted on the pivot frame, the pivot frame latch being operable to selectively retain the pivot frame in the pivot frame latched position; and (f) a panel mounting structure located on the pivot frame for receiving a display panel of a gaming machine.

9. The gaming machine cabinet component of claim 8 wherein the display panel received on the panel mounting structure covers at least a portion of the compartment front opening when the lift frame is in the lift frame latched position and the pivot frame is in the pivot frame latched position and wherein a lower end of the pivot frame pivots away from the lift frame in an arc about the pivot axis as the pivot frame is moved from the pivot from latched position to the pivot frame raised position.

10. The gaming machine cabinet component of claim 8 further including:

(a) a right-side lift structure having a first component mounted on a right-side member of the lift frame and a second component mounted on a right-side wall of the compartment; and (b) a left-side lift structure having a first component mounted on a left-side member of the lift frame and a second component mounted on a left-side wall of the compartment, the right-side lift structure and the left-side lift structure cooperating to facilitate the movability of the lift frame between the lift frame latched position and the lift frame raised position.

11. The gaming machine cabinet component of claim 8 wherein:

(a) the pivot frame includes a right-side pivot frame member, a left-side pivot frame member; and a cross-member arrangement connecting the right-side pivot frame member and the left-side pivot frame member; and (b) the right-side pivot frame member includes a right-side pivot element providing a pivot connection to the right-side member of the lift frame and the left-side pivot frame member includes a left-side pivot element providing a pivot connection to the left-side member of the lift frame.

12. The gaming machine cabinet component of claim 8 further including a support system operating between the lift frame and the compartment to retain the lift frame in a given position along the lift axis between the lift frame latched position and the lift frame raised position.

13. The gaming machine cabinet component of claim 8 further including an angled panel at an upper end of the compartment, the angled panel extending in a plane forming an acute angle with the compartment longitudinal axis, the acute angle defining a maximum pivot angle of the pivot frame raised position relative to the compartment longitudinal axis.

14. The gaming machine cabinet component of claim 8 wherein the pivot frame is pivotally mounted on the lift frame so that the pivot axis is located at an uppermost end of the pivot frame.

15. A method for opening a gaming machine cabinet component that defines a compartment volume of a gaming machine cabinet and defines a compartment front opening to the compartment volume, the method including:

(a) moving a lift frame and pivot frame assembly mounted within the compartment volume upwardly from a lift frame latched position in which a gaming machine panel mounted on a pivot frame of the lift frame and pivot frame assembly covers at least a portion of the compartment front opening from a first lateral side of the compartment to a second lateral side of the compartment, the upward movement of the lift frame and pivot frame assembly separating a lower edge of the gaming machine panel from a lower front element of the gaming machine cabinet; and (b) with the lower edge of the gaming machine panel separated from the lower front element of the gaming machine cabinet, pivoting the pivot frame and gaming machine panel about a pivot axis defined at an upper end of a lift frame of the lift frame and pivot frame assembly, the pivoting separating the gaming machine panel from the compartment front opening to provide access to the compartment volume.

16. The method of claim 15 further including operating a lift frame latch to release a connection between the lift frame and compartment to allow the upward movement of the lift frame and pivot frame assembly.

17. The method of claim 16 further including operating a pivot frame latch to release a connection between the lift frame and the pivot frame to allow the pivoting of the pivot frame about the pivot axis.

18. The method of claim 16 wherein a maximum pivot angle about the pivot axis is defined by an angled panel at an upper end of the compartment, the angled panel extending in a plane forming an acute angle with a longitudinal axis of the compartment.

* * * * *